United States Patent [19]

Leonov et al.

[11] Patent Number: 4,878,376

[45] Date of Patent: Nov. 7, 1989

[54] METHOD AND APPARATUS FOR TESTING SPUTTER TARGETS

[75] Inventors: Mark Leonov; Jan Kordel, both of Santa Clara, Calif.

[73] Assignee: Intel Corporation, Santa Clara, Calif.

[21] Appl. No.: 290,163

[22] Filed: Dec. 27, 1988

[51] Int. Cl.[4] .............................................. G01M 3/26
[52] U.S. Cl. ....................................................... 73/40
[58] Field of Search ........................... 73/37, 40, 46, 48

[56] References Cited

U.S. PATENT DOCUMENTS

| | | | |
|---|---|---|---|
| 1,371,484 | 3/1921 | Howard | 73/40 |
| 2,403,897 | 7/1946 | Aller | 73/40 |
| 2,512,134 | 6/1950 | Baule | 73/37 |
| 3,524,342 | 8/1970 | Hobbs | 73/40 |
| 4,491,509 | 1/1985 | Krause | 204/192.12 |
| 4,698,999 | 10/1987 | Trick et al. | 73/40 |

FOREIGN PATENT DOCUMENTS 2587486  3/1987  France ................................ 73/49.8
215694  10/1941  Switzerland ........................ 73/40

Primary Examiner—Hezron E. Williams
Attorney, Agent, or Firm—Blakely, Sokoloff, Taylor & Zafman

[57] ABSTRACT

A test fixture for sputter targets used in the manufacture of semiconductor devices and a method of testing sputter targets. The test fixture comprises a specially shaped piece of material which is adapted to receive a sputter target. The test fixture generally conforms to the shape of the sputter target. The interface between the test fixture and the sputter target is carefully manufactured so as to maintain an airtight seal. A passageway is disposed within one sidewall of the test fixture. A vacuum tubing is disposed within the passageway and valve is connected to the tubing so that the cavity within the test fixture can be evacuated. The size of the cavity is kept small so that it may be quickly evacuated. The present invention provides an efficient and cost effective method of testing sputter targets prior to their being placed in the sputter machine.

11 Claims, 1 Drawing Sheet

METHOD AND APPARATUS FOR TESTING SPUTTER TARGETS

FIELD OF THE INVENTION

This invention relates to a test fixture for sputter targets which are used in the manufacture of semiconductor devices, and a method for testing sputter targets

BACKGROUND OF THE INVENTION

In the semiconductor field, integrated circuits are manufactured from large pieces of semiconductor material commonly known as wafers. The wafers have deposited on them various layers of conducting and non-conducting material. Each of these layers are separately deposited on the wafer, as it is built up in a step-by-step process. The layers can be applied to the wafer using any one of several methods which are well known in the art.

One of these well-known deposition methods involves the use of a sputter machine. A sputter machine typically deposits a conductive material, such as aluminum, onto the wafer. In the sputter process, a sputter target containing a layer of conductive material is mounted into a cavity in the sputter machine. Several wafers are then placed beneath the sputter target. The wafers and the metal are oppositely charged, and the metal is deposited onto the wafers using an electrical process.

The amount of conductive material which is deposited onto the wafer is carefully controlled. This is because it is necessary to build up layers of uniform thickness on the wafer. Any impurities which may be present during the sputter process can become deposited onto the wafers. These impurities are also undesirable as they eventually lead to decreased manufacturing yields in the sputter process. These decreased yields directly increase the cost of manufacturing the semiconductors.

In order to eliminate as many impurities as possible, the sputter process is carried out in a vacuum. This does not, however, require that the entire sputter machine be placed within a vacuum. Instead, the cavity within the sputter machine is evacuated during the sputter process. Therefore, when the sputter target is mounted onto the sputter machine, there needs to be an airtight seal between the target and the machine. Without this seal, air would quickly leak into the cavity, thus allowing impurities to be introduced to the sputter process.

The sputter process transfers the layer of conductive material from the sputter target to the wafer. As a result, the conductive material becomes depleted over time. It is therefore necessary to periodically replace the sputter target with a target containing a new layer of conductive material. In prior art sputter devices, there was no way of testing a target prior to its being mounted on the machine to insure that there would be an effective seal between the target and the machine. Often, a new target would be placed on the machine and the vacuum cavity would be evacuated before it was discovered that there was a leak in the seal. Thus, additional time would be necessary to replace the defective target and again draw the air out of the cavity.

All of the time spent while the new target is being placed into the sputter machine is undesirable because the manufacturing process must be shut down. This downtime leads directly to increased production costs for the semiconductor devices.

SUMMARY OF THE INVENTION

The present invention overcomes the disadvantages of the prior art by providing a test fixture for the sputter target. The test fixture allows the target to be tested for a proper seal prior to being mounted within the sputter machine. The test fixture comprises a specially shaped piece of material which is adapted to receive a sputter target. The test fixture generally conforms to the shape of the sputter target. The interface between the test fixture and the sputter target is carefully manufactured so as to maintain an airtight seal. A passageway is disposed within one sidewall of the test fixture. A vacuum tubing is disposed within the passageway and valve is connected to the tubing so that the cavity within the test fixture can be evacuated. The size of the cavity is kept small so that it may be quickly evacuated. The present invention provides an efficient and cost effective method of testing sputter targets prior to their being placed in the sputter machine.

DETAILED DESCRIPTION OF THE INVENTION

A test fixture for use in conjunction with a sputter machine used in the manufacturing of semiconductor devices is disclosed. In the following description, numerous details and specific methods are set forth in order to provide a more complete description of the present invention. It will be apparent to those skilled in the art, however, that the present invention may be practiced without these specific details. In other instances, well known elements such as vacuum couplings are not described in detail so as not to unnecessarily obscure the present invention. Moreover, throughout the following specification, a description of the present invention is made with reference to a sputter target which is used in the semiconductor manufacturing industry. The sputter target is included in the description simply in order to provide a more thorough understanding of the invention and its operation. While the invention is used in conjunction with the sputter target, it is to be understood that the target is not an element of the present invention. Instead, the invention consists of the test fixture and a method of testing the sputter target.

Figure 1:
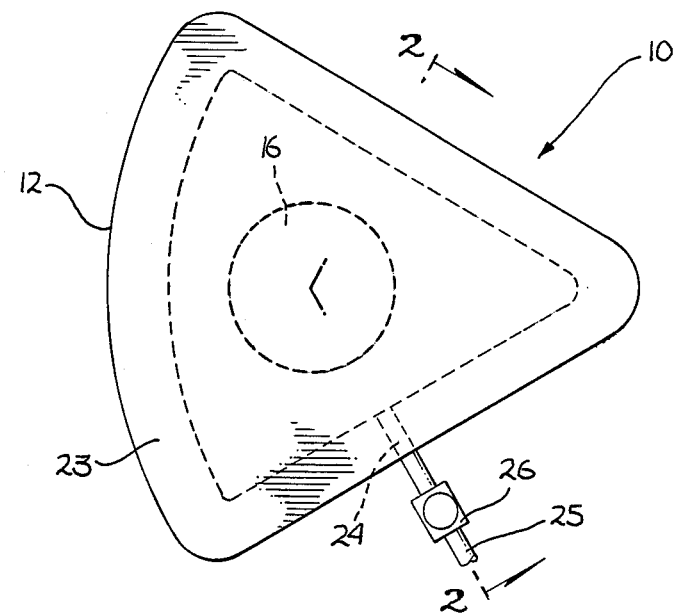
FIG. 1 is a top view of the test fixture of the present invention shown in combination with a sputter target.
Figure 2:
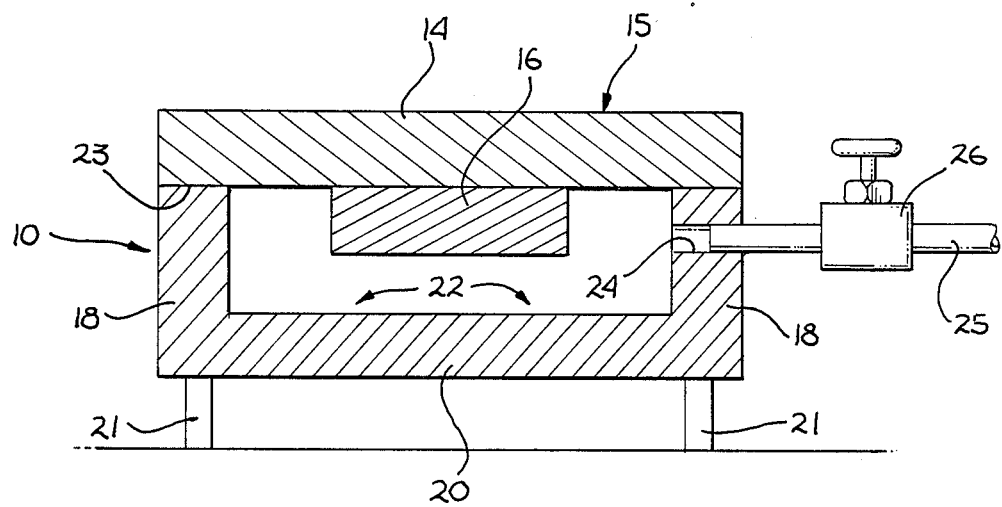
FIG. 2 is a cross-sectional view of the test fixture of the present invention taken along the line 2—2 in combination with a sputter target.

Referring first to FIG. 1, a top view of the test fixture 10 is shown with a sputter target 15 mounted on it. As shown, the test fixture 10 is substantially triangular in shape with one side 12 of the fixture being curved. This shape is chosen for the preferred embodiment as it is the shape most commonly used for sputter targets. As best shown in FIG. 2, the sputter target 15 is placed on top of the test fixture 10 when it is in use. The sputter target 15 comprises a base 14 to which a layer of conducting material 16 is attached. When the sputter target 15 is placed within a sputter machine (not shown), it is held within the machine by means of screws or other fastening devices (not shown) connected to the base 14. Although the test fixture 10 is shown in a specific shape, it will be appreciated by those skilled in the art that various other shapes can be utilized if desired. These other shapes may be used if, for example, it is necessary to test a sputter target having a different shape.

The test fixture 10 is manufactured from a suitable material which is capable of supporting the sputter target. In the preferred embodiment, the text fixture is machined from aluminum. The test fixture is formed with sidewalls 18 and bottom floor 20. As noted above, one of the sidewalls 12, in the preferred embodiment, is curved. The sidewalls define an outer boundary of a cavity 22 located in the interior of the test fixture. The cavity is best shown in FIG. 2. As shown, the cavity is arranged so as to receive the layer of conductive material 16 which is attached to the sputter target 14.

The present invention contemplates some general limitations on the dimensions of the test fixture. The height of the sidewalls 18 is not critical. However, in the preferred embodiment, their height is chosen so that the cavity 22 remains as small as possible. It is desirable to minimize the size of the cavity because a smaller cavity can be evacuated more quickly. This allows a particular target to be tested more efficiently. In the preferred embodiment, the thickness of the bottom floor 20 is also carefully chosen. As can be seen best in FIG. 1, the area of the bottom floor is comparatively large when measured against the overall size of the test fixture 10. When the cavity 22 is evacuated, the ambient air pressure outside the fixture therefore exerts a relatively large force on the bottom floor. The bottom floor must therefore be thick enough to withstand this force without failing. Support legs 21 are provided on the underside of the test fixture.

A passageway 24 is located within one of the sidewalls 18. Located within the passageway is a length of vacuum tubing 25. Connected to the vacuum tubing is a vacuum coupling and valve 26. The valve is not described in detail since it is believed that such devices are well known to those skilled in the art. However, the valve 26 should be able to maintain an airtight seal without any appreciable leakage when the cavity 22 is evacuated. The vacuum tubing 25 is also connected to the sidewall 18 of the test fixture 10 by means of an airtight seal. The tubing can be held in place by a sealing epoxy, or other equivalent means such as welding. It will be appreciated by those skilled in the art that whatever method is chosen will be a matter of design choice. In FIG. 1 the passageway 24 is shown located at a specific location in one of the sidewalls 18. It will be apparent to those skilled in the art that the passageway 24, and associated vacuum tubing 25, may be easily located at another point along the sidewall, or even in a different sidewall 18 entirely.

When the sputter target 15 is placed on the test fixture 10 it rests on the top surface 23 of the sidewalls 18. The base 14 of the sputter target is flat. The top surface 23 of the sidewalls 18 acts to form a seal with the sputter target. Thus, the top 23 of the sidewalls 18 is carefully formed to closely conform to the base 14 of the sputter target 15. In the preferred embodiment, the top surface 23 is machined to be flat with a high degree of precision. It will be appreciated by those skilled in the art that different contours can be used depending on the particular type of sputter target employed.

The operational procedures of the test fixture are fairly straightforward. A target which is desired to be tested is placed on the test fixture. The vacuum tubing 25 is the connected to a vacuum source (not shown) and the valve 26 is opened. The vacuum source evacuates the air within the cavity 22. Once the cavity 22 is evacuated, the valve 26 is closed, sealing of the cavity. The seal of the sputter target is then tested for leaks. This test is accomplished using any one of a number of well known techniques. In the preferred embodiment, the difference in air pressure between the ambient air and the vacuum in the cavity 22 exerts a force on the sputter target which retains the sputter target 15 tightly on the test fixture. If there is a leak present on the sputter target, air will eventually leak into the cavity, thus releasing the sputter target. Thus one way of testing the target for a proper seal is to wait a predetermined amount of time and then simply check to see if the sputter target is being held on the test fixture. The amount of time necessary will vary depending on the quality of seal which is required.

If the seal on the sputter target is determined to be satisfactory, then the sputter target may be placed within the sputter machine. It will be apparent to those skilled in the art, that the present invention provides a means for quickly testing several sputter targets prior to their being used. Another advantage of the present invention is that it provides a means for storing the targets after they are tested. The targets can simply be left on the test fixtures. The bottom of the target rests directly on the test fixture, and, as noted above, it is held in place by the pressure differential. This prevents the possibility of a layer of oxidation from being built up on the sputter target. This oxidation is undesirable as it may lead to impurities on the sputter target. The sputter targets may also be stored in an inert gas environment to further protect the seal.

Accordingly, a test fixture for sputter targets used in the manufacture of semiconductor devices has been disclosed.

What is claimed is:

1. A device for testing sputter targets comprising:
    a base, said base having a shape which conforms generally to the shape of said sputter target;
    at least one sidewall connected to said base at a peripheral edge thereof and extending vertically upward, said sidewall and said base defining a cavity, said sidewall having disposed therein a passageway;
    an evacuation means coupled to said passageway for evacuating ambient air from said cavity.

2. The device of claim 1 wherein said at least one sidewall has a top surface and said top surface is formed so as to be substantially flat.

3. The device of claim 2 wherein said base is substantially in the shape of a triangle.

4. The device of claim 3 wherein there are three sidewalls.

5. The device of claim 4 wherein one of said sidewalls is curved.

6. A fixture for testing a seal located on a sputter target, comprising:
    a substantially triangular shaped base, said base being formed from a material having a predetermined thickness;
    a sidewall connected to each peripheral side of said base and extending vertically upward a predetermined distance such that said sidewalls and said base form a cavity, the top surface of each of said sidewall being shaped so as to be substantially flat and conforms generally to the shape of said sputter target;
    a means for evacuating ambient air from said cavity, thereby subjecting said cavity to a vacuum, said means comprising a passageway disposed within one of said sidewalls, a vacuum tubing having first and second ends, said vacuum tubing being connected to said sidewall by an airtight seal, said first end of said tubing being disposed within said passageway and said second end of said tubing extending away from said base and a valve connected to said second end of said vacuum tubing.

7. The device of claim 6 wherein said height of said sidewalls is chosen so as to allow said cavity to receive a layer of material connected to said sputter target.

8. The device of claim 6 wherein said thickness of said base is chosen such that said base is able to withstand a force exerted by ambient air pressure when said cavity is subjected to a vacuum.

9. The device of claim 6 wherein said base and said sidewalls are made from a single piece of material.

10. The device of claim 9 wherein said material is aluminum.

11. A method for testing sputter targets used in the manufacture of semiconductor devices comprising the steps of:
    placing said sputter target on a test fixture such that a sealing surface of said sputter target contacts a predetermined area of said fixture, said fixture having located therein a cavity, said cavity being formed by a base and sidewalls of said fixture and being covered by said sputter target;
    evacuating substantially all of the ambient air from said cavity;
    waiting a predetermined amount of time;
    measuring the amount of air present in said cavity so as to verify that an airtight seal exists between said sealing surface and said predetermined area of said fixture.

* * * * *